(12) United States Patent
Fukuyama

(10) Patent No.: US 10,693,154 B2
(45) Date of Patent: Jun. 23, 2020

(54) METHOD FOR MANUFACTURING FUEL CELL STACK

(71) Applicant: NISSAN MOTOR CO., LTD., Yokohama-shi, Kanagawa (JP)

(72) Inventor: Yosuke Fukuyama, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/081,324

(22) PCT Filed: Oct. 18, 2016

(86) PCT No.: PCT/JP2016/080775
§ 371 (c)(1),
(2) Date: Aug. 30, 2018

(87) PCT Pub. No.: WO2017/154258
PCT Pub. Date: Sep. 14, 2017

(65) Prior Publication Data
US 2019/0088959 A1    Mar. 21, 2019

(30) Foreign Application Priority Data

Mar. 11, 2016    (JP) ................................ 2016-048336

(51) Int. Cl.
*H01M 8/0286* (2016.01)
*H01M 8/2485* (2016.01)
(Continued)

(52) U.S. Cl.
CPC ....... *H01M 8/0286* (2013.01); *H01M 8/0282* (2013.01); *H01M 8/0284* (2013.01);
(Continued)

(58) Field of Classification Search
CPC ............. H01M 8/0286; H01M 8/2485; H01M 8/0282; H01M 8/2425; H01M 2008/1293;
(Continued)

(56) References Cited

U.S. PATENT DOCUMENTS 3,558,360 A * 1/1971 Sverdrup .......... H01M 8/04223
429/487
2011/0111320 A1    5/2011 Suda et al.
(Continued)

FOREIGN PATENT DOCUMENTS

CN    103828111 A    5/2014
CN    105103352 A    11/2015
(Continued)

OTHER PUBLICATIONS

English translation of Kr-20150075189-A (Year: 2015).*

*Primary Examiner* — Milton I Cano
*Assistant Examiner* — Philip A. Stuckey
(74) *Attorney, Agent, or Firm* — Foley & Lardner LLP

(57) ABSTRACT

The manufacturing method of the present invention is to manufacture a fuel cell stack by heating a stack of fuel cell single cells each of which includes organic substance-containing inorganic sealing members, a separator, an anode electrode, an electrolyte and a cathode electrode. The organic substance in the organic substance-containing inorganic sealing members is removed by heating the stack while supplying an oxygen-containing gas to fuel channels on the anode electrode side and externally applying an electric current so as to migrate charges from the anode electrode to the cathode electrode.

11 Claims, 3 Drawing Sheets

(51) Int. Cl.
  *H01M 8/0282*  (2016.01)
  *H01M 8/0284*  (2016.01)
  *H01M 8/2425*  (2016.01)
  *H01M 8/124*  (2016.01)

(52) U.S. Cl.
  CPC ....... *H01M 8/2425* (2013.01); *H01M 8/2485* (2013.01); *H01M 2008/1293* (2013.01); *Y02P 70/56* (2015.11)

(58) Field of Classification Search
  CPC ...... H01M 4/9025; H01M 4/905; H01M 8/12; H01M 8/0284; Y02P 70/56
  See application file for complete search history.

(56) References Cited

U.S. PATENT DOCUMENTS

| | | | |
|---|---|---|---|
| 2012/0244448 A1* | 9/2012 | Hallum | H01M 8/1097 429/409 |
| 2014/0110270 A1 | 4/2014 | Heiredal-Clausen et al. | |
| 2014/0113162 A1 | 4/2014 | Hottinen et al. | |
| 2014/0295313 A1 | 10/2014 | Reis et al. | |
| 2016/0365586 A1 | 12/2016 | Reis et al. | |

FOREIGN PATENT DOCUMENTS

| | | | |
|---|---|---|---|
| JP | 2011-228091 A | | 11/2011 |
| KR | 20150075189 A | * | 7/2015 |
| WO | WO-2009/119771 A1 | | 10/2009 |
| WO | WO-2013/001166 A1 | | 1/2013 |

\* cited by examiner

METHOD FOR MANUFACTURING FUEL CELL STACK

TECHNICAL FIELD

The present invention relates to a method for manufacturing a fuel cell stack, in more detail to a method for manufacturing a solid oxide fuel cell stack.

BACKGROUND ART

A solid oxide fuel cell (hereinafter also referred to simply as an SOFC) includes a cathode electrode on one side of a solid oxide electrolyte and an anode electrode on the other side.

When oxygen-containing gas such as air is supplied to the cathode electrode and fuel such as hydrogen is supplied to the anode electrode, reaction of oxygen ion with fuel occurs to generate electric power.

A metal catalyst is used for the anode electrode. Oxidation of the metal catalyst may decrease the catalyst activity or cause damage on a fuel cell stack due to a change in volume and the resultant stress.

Patent Document 1 which is WO 2013/001166A discloses applying a current of the opposite direction from that in power generation to a fuel cell when the fuel cell is not in operation, which is intended to prevent oxygen from irreversibly penetrating into a fuel channel to cause oxidation of the metal catalyst of the anode electrode.

CITATION LIST

Patent Document

Patent Document 1: WO 2013/001166A

SUMMARY OF INVENTION

Technical Problem

An oxygen channel for supplying oxygen-containing gas such as air to the cathode electrode and a fuel channel for supplying fuel such as hydrogen to the anode electrode are sealed with a sealing member in order to prevent gas leakage.

An inorganic sealing member that withstands the operation temperature of an SOFC is used for the sealing member.

The inorganic sealing member contains an organic binder and an organic solvent and the like. This improves handling of the sealing member and enables readily assembling the fuel cell stack with high precision.

However, an organic substance-containing inorganic sealing member that contains the organic binder and the organic solvent and the like in the inorganic sealing member may cause gas leakage since the residual organic substance degrades the sealing performance. To avoid this, the organic substance in the inorganic sealing member has to be removed to densify the inorganic sealing member prior to operation of the fuel cell stack.

When the organic substance-containing inorganic sealing member is used as describe above, it is necessary to oxidize the organic substance to remove it as carbon dioxide. Accordingly, it is necessary to supply an oxygen-containing gas also to the fuel channel on the anode electrode side under a high-temperature environment. However, when an oxygen-containing gas is supplied to the fuel channel under a high-temperature environment, it oxidizes the anode electrode to decrease the catalyst activity and to cause damage on the fuel cell stack.

The present invention has been made in view of the above-described problem in the prior art, and an object thereof is to provide a method for manufacturing a fuel cell stack that can achieve both prevention of oxidation of anode electrodes and removal of the organic substance in the organic substance-containing inorganic sealing member.

Solution to Problem

As a result of keen study for achieving the above-described object, the present inventor found that both removal of the organic substance in the organic substance-containing inorganic sealing member and prevention of oxidation of the anode electrode can be achieved by applying heat while positively supplying oxygen-containing gas to fuel channels, which are disposed on the anode electrode side, and externally applying an electric current to forcibly migrate charges from the anode electrode to the cathode electrode through an electrolyte.

That is, the method for manufacturing the fuel cell stack of the present invention is to manufacture the fuel cell stack by heating a stack of fuel cell single cells each of which comprises organic substance-containing inorganic sealing members, a separator, an anode electrode, an electrolyte and a cathode electrode.

The method comprises an organic substance removing step of removing an organic substance in the organic substance-containing inorganic sealing members.

The organic substance removing step involves heating the stack while supplying an oxygen-containing gas to the fuel channels on the anode electrode side and externally applying an electric current to the stack to migrate charges from the anode electrodes to the cathode electrodes through the electrolytes.

Advantageous Effects of Invention

In the present invention, the organic substance in the organic substance-containing inorganic sealing members is removed while supplying the oxygen-containing gas to the fuel channels on the anode electrode side and externally applying the electric current to the stack of the fuel cell single cells to migrate the electric charges from the anode electrodes to the cathode electrodes through the electrolytes. Therefore, it is possible to provide the method for manufacturing the fuel cell stack that can achieve both prevention of oxidation of the anode electrodes and the sealing performance of the organic substance-containing inorganic sealing members.

DESCRIPTION OF EMBODIMENTS

The method for manufacturing the fuel cell stack of the present invention will be described in detail.

The manufacturing method of the present invention is to manufacture a fuel cell stack by heating a stack of fuel cell single cells each of which comprises organic substance-containing inorganic sealing members, a separator, an anode electrode, an electrolyte and a cathode electrode.

The method involves removing an organic substance in the organic substance-containing inorganic sealing members by applying heat while supplying an oxygen-containing gas to the fuel channels on the anode electrode side and applying an electric current of the opposite direction from that in power generation (hereinafter also referred to as a reverse current) to the fuel cell stack to migrate charges from the anode electrodes to the cathode electrodes through the electrolytes.

First, the structure of the fuel cell single cell will be described. Example structures of the fuel cell single cell include a metal-supported cell (MSC) in which electrodes and an electrolyte are supported by a porous metal sheet, an electrolyte-supported cell (ESC) with a thick electrolyte, an anode-supported cell (ASC) with a thick anode, a cathode-supported cell (CSC) with a thick cathode, and the like.

The method for manufacturing the fuel cell stack of the present invention is applicable to stacks of fuel cell single cells having any of the above-described structures. In the following, a fuel cell including the metal-supported cell will be described as an example.

The metal-supported cell is susceptible to oxidation as with the anode electrode. However, the method for manufacturing the fuel cell stack of the present invention can prevent oxidation of such metal-supported cell.

Figure 1:
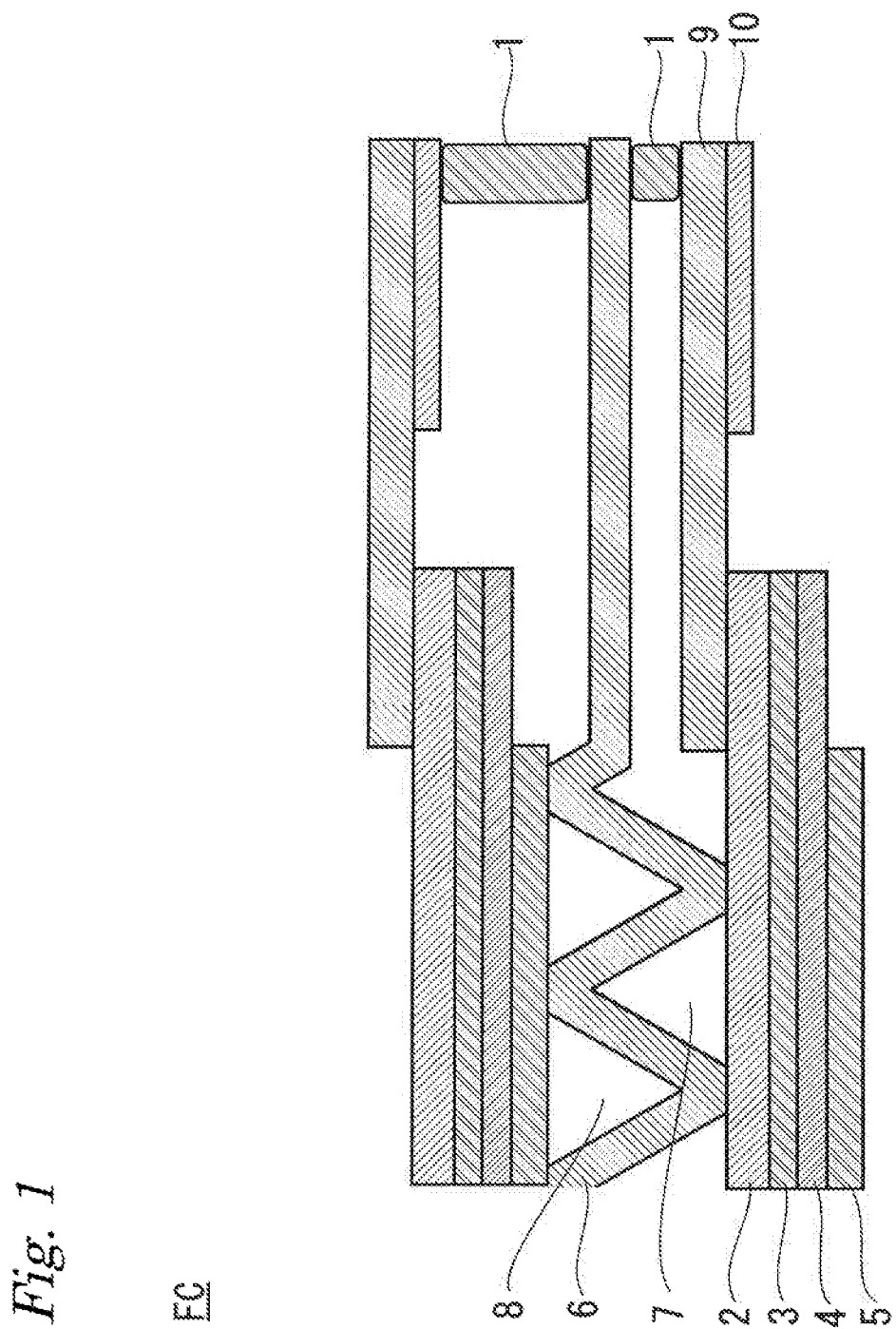
FIG. 1 is a cross-sectional view of an example of a metal-supported cell.

The metal-supported cell will be descried referring to FIG. 1. FIG. 1 is a schematic view illustrating a sectional configuration of the metal-supported cell.

The structure of the metal-supported cell as used herein is such that an anode electrode 3 (fuel electrode), a solid electrolyte 4 formed on the surface of the anode electrode 3 and a cathode electrode 5 (air electrode) formed on the surface of the solid electrolyte 4 are layered on one side of a metal support layer 2 of a porous sheet metal support that serves as a support (base).

The metal-supported cell comprises a separator 6 between the metal support layer 2 and a cathode electrode 5 of an adjacent fuel cell single cell. An end of the separator is joined to a frame 9, an insulator 10 and the like by the above-described organic substance-containing inorganic sealing members 1.

Fuel channels 7 are formed between the separator 6 and the metal support layer 2, and oxygen channels 8 are formed between the separator 6 and the cathode electrode 5.

Next, the materials of the fuel cell single cell will be described.

Organic Substance-Containing Inorganic Sealing Member

The organic substance-containing inorganic sealing members contain an inorganic material and an organic substance such as an organic binder and an organic solvent. The organic substance-containing inorganic sealing members are flexible and morphologically stable and are easy to handle.

The organic substance-containing inorganic sealing members can be molded by printing ink or paste of the sealing material or by punching a sheet or a plate of the sealing material into a complex shape. This enables assembling a stack as the fuel cell stack with high precision.

After being attached to the stack, the organic substance-containing inorganic sealing members are heated so that the organic substance is oxidized and removed as carbon dioxide. The sealing members are thus densified and sintered to seal the fuel channels and the oxygen channels so as to prevent gas leakage.

The inorganic material is not particularly limited and may be any material that withstands the operation temperature of an SOFC. Examples of such materials include glass, ceramics and the like.

Anode Electrode

The structural materials of the anode electrode that can be used include a metal catalyst that has a hydrogen oxidizing activity and is made of a metal and/or an alloy stable under a reducing atmosphere.

Examples of such materials include nickel (Ni), palladium (Pd), platinum (Pt), ruthenium (Ru), Ni—Fe alloys, Ni—Co alloys, Fe—Co alloys, Ni—Cu alloys, Pd—Pt alloys and the like.

The porous anode electrode is formed by mixing such a structural material of the anode electrode with graphite powder and the like and sintering the mixture by heat.

The manufacturing method of the present invention is suitably applicable to a fuel cell stack with nickel (Ni)-containing anode electrodes.

Since nickel (Ni) changes its volume by oxidation to a particularly large degree, the nickel (Ni)-containing anode electrodes are easily damaged by oxidation. However, the manufacturing method of the present invention can prevent the fuel cell stack from being damaged.

Cathode Electrode

The structural materials of the cathode electrode are not particularly limited. Examples of such materials include perovskite oxides, specifically lanthanum manganite oxides, lanthanum ferrite oxides, lanthanum cobaltite oxide, strontium cobaltite oxides and lanthanum nickel oxides.

Electrolyte

The materials of the electrolyte are not particularly limited. Such materials that can be used include oxides that have oxygen ion conductivity and function as a solid electrolyte.

Examples of such materials include YSZ (yttria-stabilized zirconia: $Zr_{1-x}Y_xO_2$), SSZ (scandium-stabilized zirconia: $Zr_{1-x}Sc_xO_2$), SDC (samarium-doped ceria: $Ce_{1-x}Sm_xO_2$), GDC (gadolinium-doped ceria: $Ce_{1-x}Gd_xO_2$), LSGM (lanthanum strontium magnesium gallate: $La_{1-x}Sr_xGa_{1-y}Mg_yO_3$) and the like.

The structural materials of the anode electrode, the electrolyte or the cathode electrode are mixed with an organic binder and an organic solvent. The respective inks thus prepared are sequentially applied by screen printing or the like and dried so as to form an assembly of the electrodes and the electrolyte.

Manufacturing Method

Figure 2:
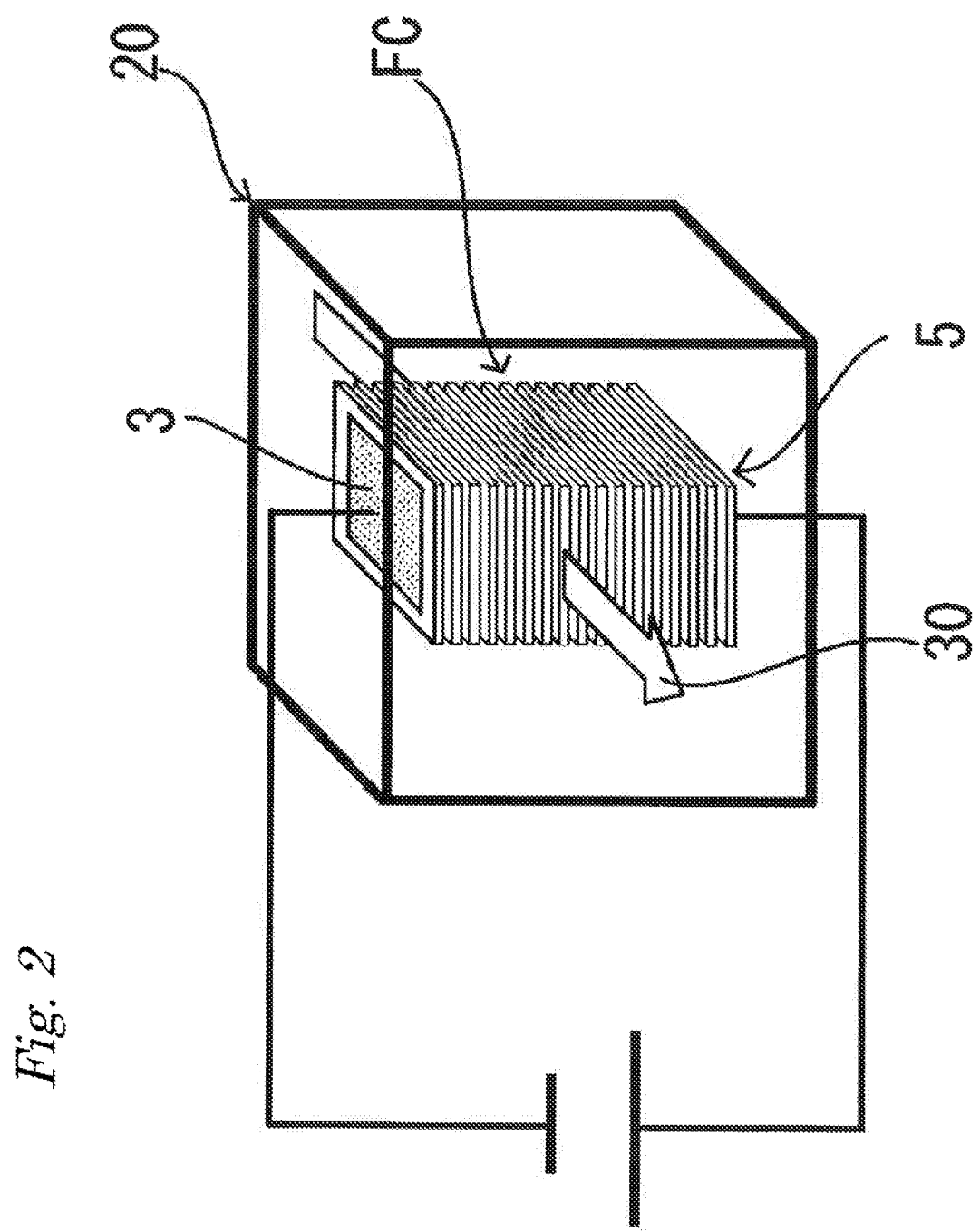
FIG. 2 illustrates the manufacturing method of the present invention.

As illustrated in FIG. 2, the method of manufacturing the fuel cell stack of the present invention comprises an organic substance removing step of removing the organic substance in the organic substance-containing inorganic sealing members 1 by heating the stack FC of the above-described fuel cell single cells in an electric oven 20 or the like while applying an electric current of the opposite direction from that in power generation and supplying an oxygen-containing gas to the fuel channels 7 on the side of the anode electrode 3.

Figure 3:
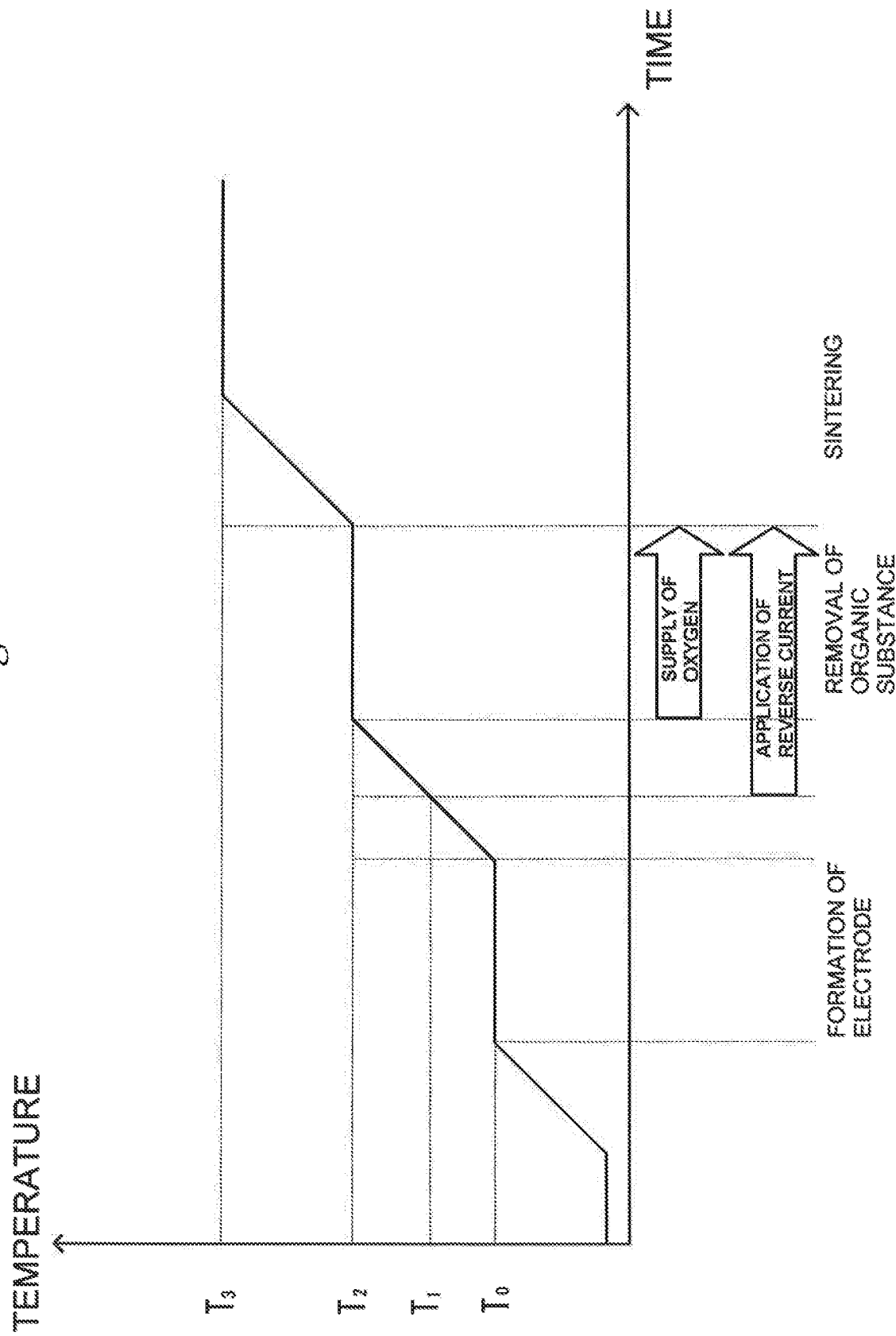
FIG. 3 is a graph illustrating the relationship of sintering temperature with current to be applied and gas to be supplied in the manufacturing method of the present invention.

The heating temperature, the electric current to be applied and the gas to be supplied in the manufacturing method of the present invention will be described with FIG. 3.

Electrode Forming Step

Prior to the organic substance removing step, an electrode forming step is performed. The electrode forming step involves forming electrodes necessary to apply the electric current.

Since the attached electrode material may sometimes be instable due to an organic solvent and the like contained therein, the electrode material is dried and stabilized in the electrode forming step.

Specifically, the fuel cell single cells are maintained at a temperature $T_0$ that is lower than the oxidation onset temperature $T_2$ of the organic substance for a certain period of time so that the electrode material is dried.

While gas is not necessarily supplied to the fuel channels on the anode electrode side in the electrode forming step, a reducing gas or a non-oxidizing gas may be supplied to replace gas in the fuel channels so as to promote drying of the electrode materials.

Organic Substance Removing Step

After the electrodes are formed in the electrode forming step, the temperature is increased up to the oxidation onset temperature $T_2$ of the organic substance or more, and the organic substance removing step is performed. In the present invention, the oxidation onset temperature $T_2$ refers to the temperature at which oxidation reaction of the organic substance in the organic substance-containing inorganic sealing members occurs.

The organic substance removing step involves applying the reverse current at a temperature of equal to or greater than the oxidation onset temperature $T_2$ of the organic substance while supplying the oxygen-containing gas to the fuel channels on the side of the anode electrode, so as to remove the organic substance in the organic substance-containing inorganic sealing members.

By applying heat and positively supplying the oxygen-containing gas to the fuel channels at a temperature of equal to or greater than the oxidation onset temperature $T_2$ of the organic substance, the organic substance in the organic substance-containing inorganic sealing members is oxidized into carbon dioxide and removed from the organic substance-containing inorganic sealing members.

When the organic substance is removed, the organic substance-containing inorganic sealing members are densified, and the organic substance-containing inorganic sealing members that are densified prevent gas leakage.

Since the electric current of the opposite direction from that in power generation is externally applied when the oxygen-containing gas is supplied, electrochemical oxidation reaction of the metal catalyst of the anode electrodes, e.g. the reaction of the following reaction equation (1), forcibly proceeds to the left so as to prevent oxidation of the anode electrodes.

$$Ni + \tfrac{1}{2} O_2 \leftrightarrows NiO \qquad \text{Reaction Equation (1)}$$

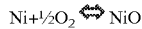

The reverse current is applied at a temperature of equal to or greater than an oxidation onset temperature $T_1$ of the anode electrodes, and the reverse current starts to be applied at least at the oxidation onset temperature $T_1$ of the anode electrodes. In the present invention, the oxidation onset temperature $T_1$ refers to the onset temperature of the oxidation reaction of the anode electrodes.

The amount of current, which is sufficient to reduce the anode electrodes, is applied. It is possible to save energy by not applying the reverse current at a temperature at which oxidation reaction of the metal catalyst of the anode electrodes does not occur (i.e. less than $T_1$).

When a reducing gas is supplied to the fuel channels, it is not necessary to apply the reverse current within the range of the oxidation onset temperature $T_1$ of the anode electrodes to the oxidation onset temperature $T_2$ of the organic substance since the oxidation reaction of the anode electrodes is prevented.

The oxidation onset temperature $T_1$ of the anode electrodes may be measured beforehand. Instead, whether oxidation reaction of the anode electrodes occurs may be continuously measured during heating to correct the oxidation onset temperature $T_1$, and the reverse current may be applied accordingly. This can prevent oxidation of the anode electrodes more surely and save the energy.

It is preferred to control the amount of current to be applied based on the temperature of the anode electrodes since oxidation of the anode electrodes typically tends to proceed faster at higher temperature.

Specifically, the amount of current is increased with an increase of the temperature of the anode electrodes so that oxidation of the anode electrodes is prevented.

Oxidation of the anode electrodes is also affected by the other factors such as the amount of oxygen-containing gas supplied in addition to the temperature. Therefore, it is preferred to control the amount of current by continuously measuring whether oxidation reaction of the anode electrodes occurs and feeding the measurement result back to the amount of current to be applied.

Whether the oxidation reaction of the anode electrodes occurs is measured by electrochemical impedance spectroscopy (EIS).

Specifically, a weak alternating signal is applied to the fuel cell single cells during heating, and the impedance of the cells is measured and analyzed from the response signals of voltage/current. In addition, since the EIS also suggests the ohmic resistance at various temperatures, the measurement results can be useful information for suitably controlling the amount of current to be applied.

To remove the organic substance, the temperature is maintained at a temperature of equal to or greater than the oxidation onset temperature $T_2$ of the organic substance for a predetermined period of time. The oxidation onset temperature $T_2$ of the organic substance refers to the temperature at which oxidation of the organic substance contained in the organic substance-containing inorganic sealing members such as an organic binder and an organic solvent starts to occur.

By maintaining a temperature of equal to or greater than the oxidation onset temperature $T_2$ of the organic substance for a redetermined period of time, it is possible to surely remove the organic substance.

The upper limit of the temperature for removing the organic substance is a temperature, at which unnecessary reactions other than oxidation reaction of the organic substance do not occur, such as a change in shape of the organic substance-containing inorganic sealing members caused by rapid vaporization of the organic substance or the like.

By starting the supply of the oxygen-containing gas to the fuel channels on the anode electrode side at a temperature of equal to or greater than the oxidation onset temperature $T_2$ of the organic substance, it is possible to reduce oxidation of the anode electrodes at a temperature of less than the oxidation onset temperature $T_2$ of the organic substance.

The time for maintaining a temperature of equal to or greater than the oxidation onset temperature $T_2$ of the organic substance may be set according to the amount of organic substance contained therein and the ease of oxidation.

In the organic substance removing step, the oxygen-containing gas is also supplied to the oxygen channels on the side of the cathode electrode so as to remove the organic substance in the organic substance-containing inorganic sealing members for the oxygen channels.

Sintering Step

After the organic substance in the organic substance-containing inorganic sealing members is removed in the organic substance removing step, a sintering step is performed.

The sintering step involves cutting off the supply of the oxygen-containing gas and increasing the temperature to a temperature $T_3$ that is higher than the oxidation onset temperature $T_2$ of the organic substance so as to sinter the organic substance-containing inorganic sealing members from which the organic substance is removed, the anode electrodes, the electrolytes, the cathode electrodes and the like.

In the sintering step, the reverse current may be applied to prevent the anode electrodes from oxidation. Alternatively, the application of the reverse current may be stopped, and a reducing gas may be supplied to the fuel channels on the anode electrode side.

REFERENCE SINGS LIST

1 Organic substance-containing inorganic sealing member
2 Metal support layer
3 Anode electrode
4 Electrolyte
5 Cathode electrode
6 Separator
7 Fuel channel
8 Oxygen channel
9 Frame
10 Insulator
20 Electric oven
30 Air
FC Stack

The invention claimed is:

1. A method for manufacturing a solid oxide fuel cell stack by heating a stack of fuel cell single cells, each of the fuel cell single cells comprising organic substance-containing inorganic sealing members, a separator, an anode electrode, an electrolyte and a cathode electrode,
the method comprising an organic substance removing step of removing an organic substance in the organic substance-containing inorganic sealing members,
the organic substance removing step comprises heating the stack while positively supplying a supply of an oxygen-containing gas to fuel channels on the anode electrode side to remove the organic substance from the inorganic sealing members and externally applying an electric current to migrate charges from the anode electrode to the cathode electrode.

2. The method for manufacturing the fuel cell stack according to claim 1, further comprising applying the electric current at a temperature of equal to or greater than an oxidation onset temperature of the anode electrode that comprises a plurality of anode electrodes,
wherein the current starts to be applied at the oxidation onset temperature of the plurality of anode electrodes.

3. The method for manufacturing the fuel cell stack according to claim 1, further comprising controlling an amount of the electric current based on a temperature of a plurality of anode electrodes,
wherein the amount of the electric current is increased with an increase of the temperature of the plurality of anode electrodes.

4. The method for manufacturing the fuel cell stack according to claim 2, further comprising controlling an amount of the electric current based on a temperature of the plurality of anode electrodes,
wherein the amount of the electric current is increased with an increase of the temperature of the plurality of anode electrodes.

5. The method for manufacturing the fuel cell stack according to claim 2, wherein the organic substance removing step comprises maintaining a temperature of equal to or greater than an oxidation onset temperature of the organic substance that is higher than the oxidation onset temperature of the plurality of anode electrodes for a predetermined period of time so as to remove the organic substance.

6. The method for manufacturing the fuel cell stack according to claim 1, wherein the oxygen-containing gas is supplied to the fuel channels on the anode electrode side at a temperature of equal to or greater than an oxidation onset temperature of the organic substance.

7. The method for manufacturing the fuel cell stack according to claim 1, further comprising a sintering step after the organic substance removing step,
wherein the sintering step comprises cutting off supply of the oxygen-containing gas to the fuel channels on the anode electrode side and increasing a temperature relative to a temperature in the organic substance removing step.

8. The method for manufacturing the fuel cell stack according to claim 7, wherein the sintering step comprises supplying a reducing gas to the fuel channels on the anode electrode side and cutting off application of the electric current.

9. The method for manufacturing the fuel cell stack according to claim 1, further comprising an electrode forming step before the organic substance removing step,
wherein the electrode forming step comprises maintaining a temperature at a temperature of less than an oxidation onset temperature of the organic substance for a predetermined period of time.

10. The method for manufacturing the fuel cell stack according to claim 1,
wherein the anode electrode contains a metal catalyst made of a metal and/or an alloy.

11. The method for manufacturing the fuel cell stack according to claim 1,
wherein each of the fuel cell single cells comprises a metal-supported cell comprising a metal support layer, and
the metal support layer supports the anode electrode, the electrolyte and the cathode electrode from a side of the anode electrode.

* * * * *